United States Patent Office 2,835,458
Patented May 20, 1958

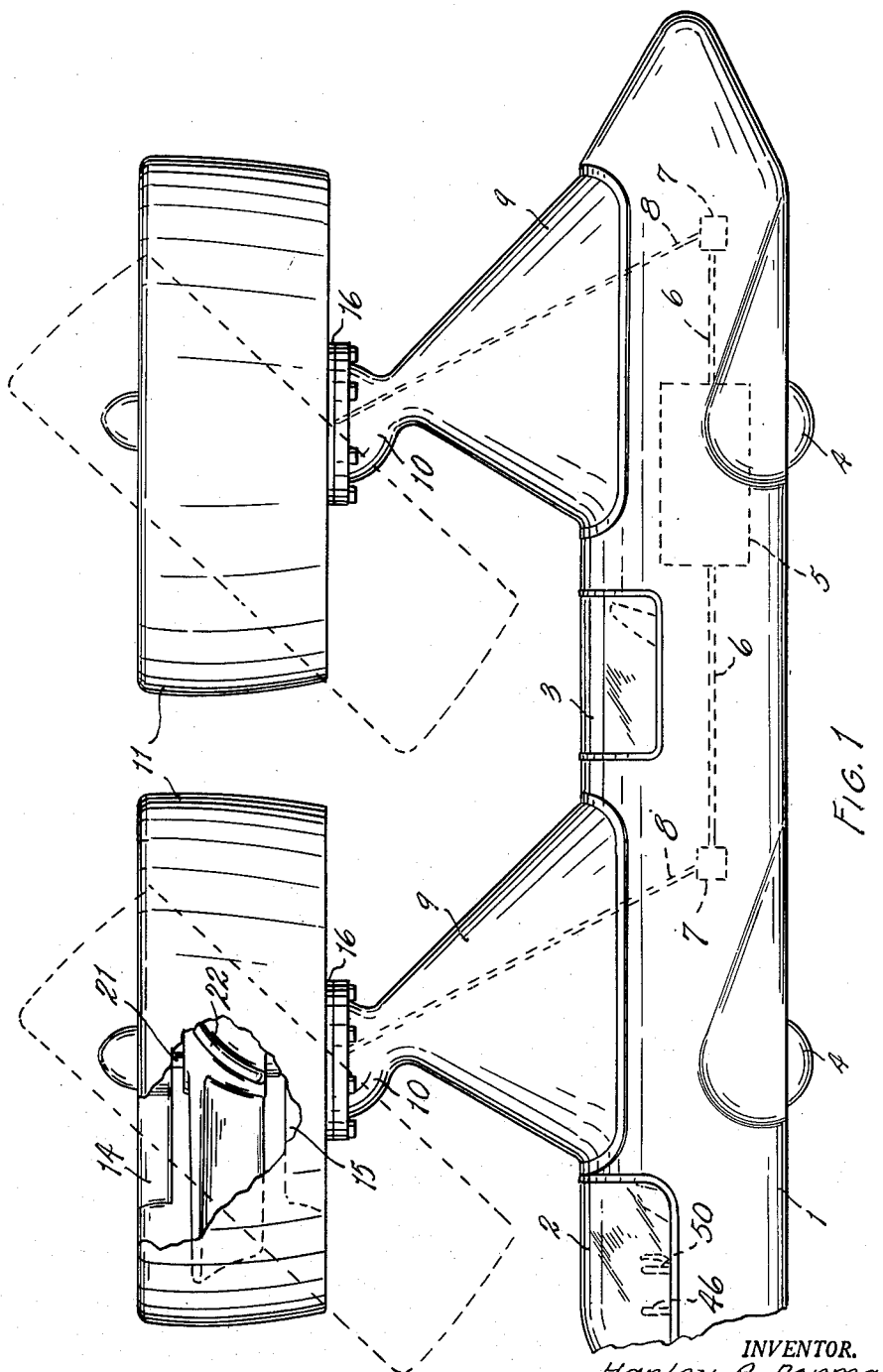

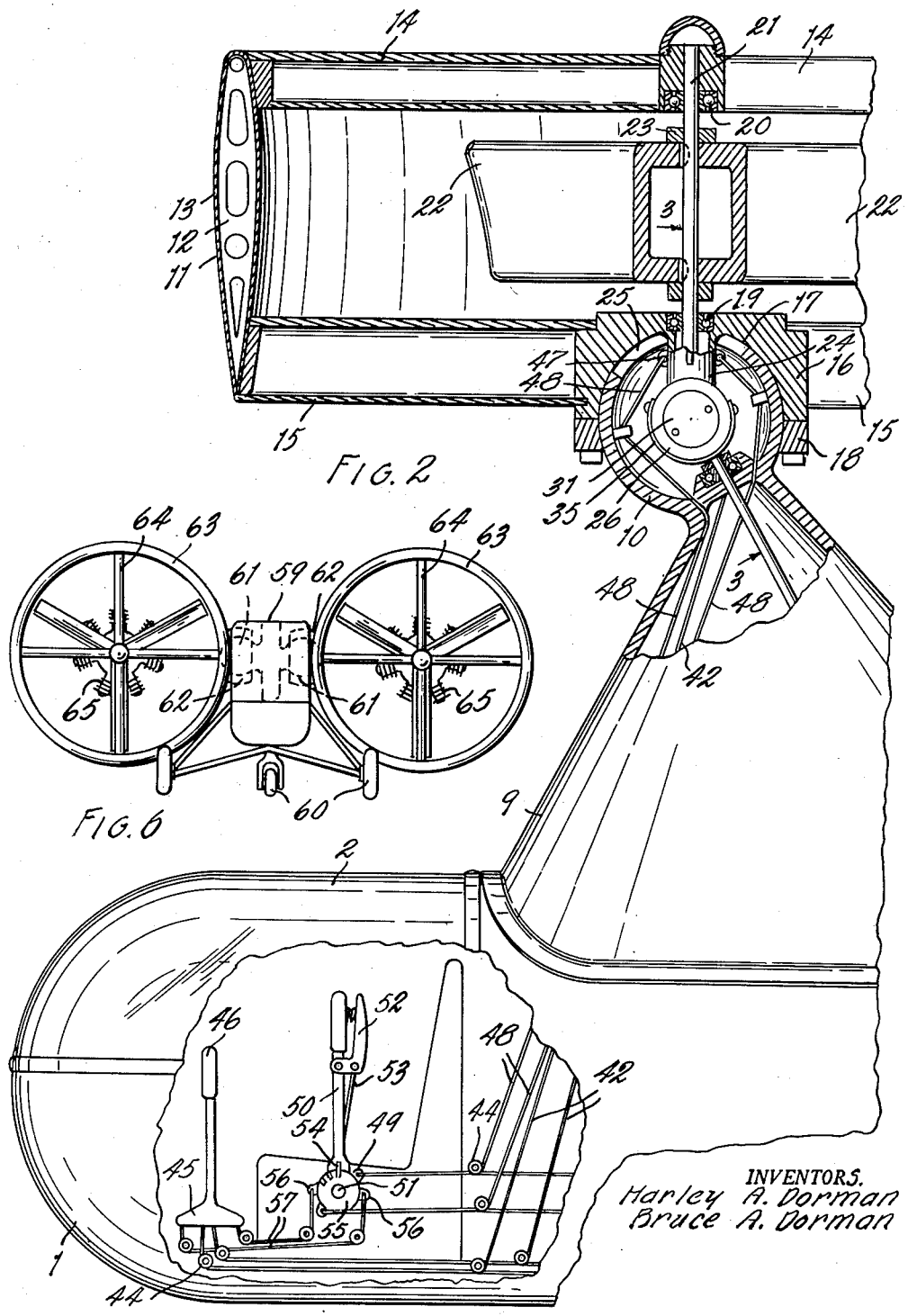

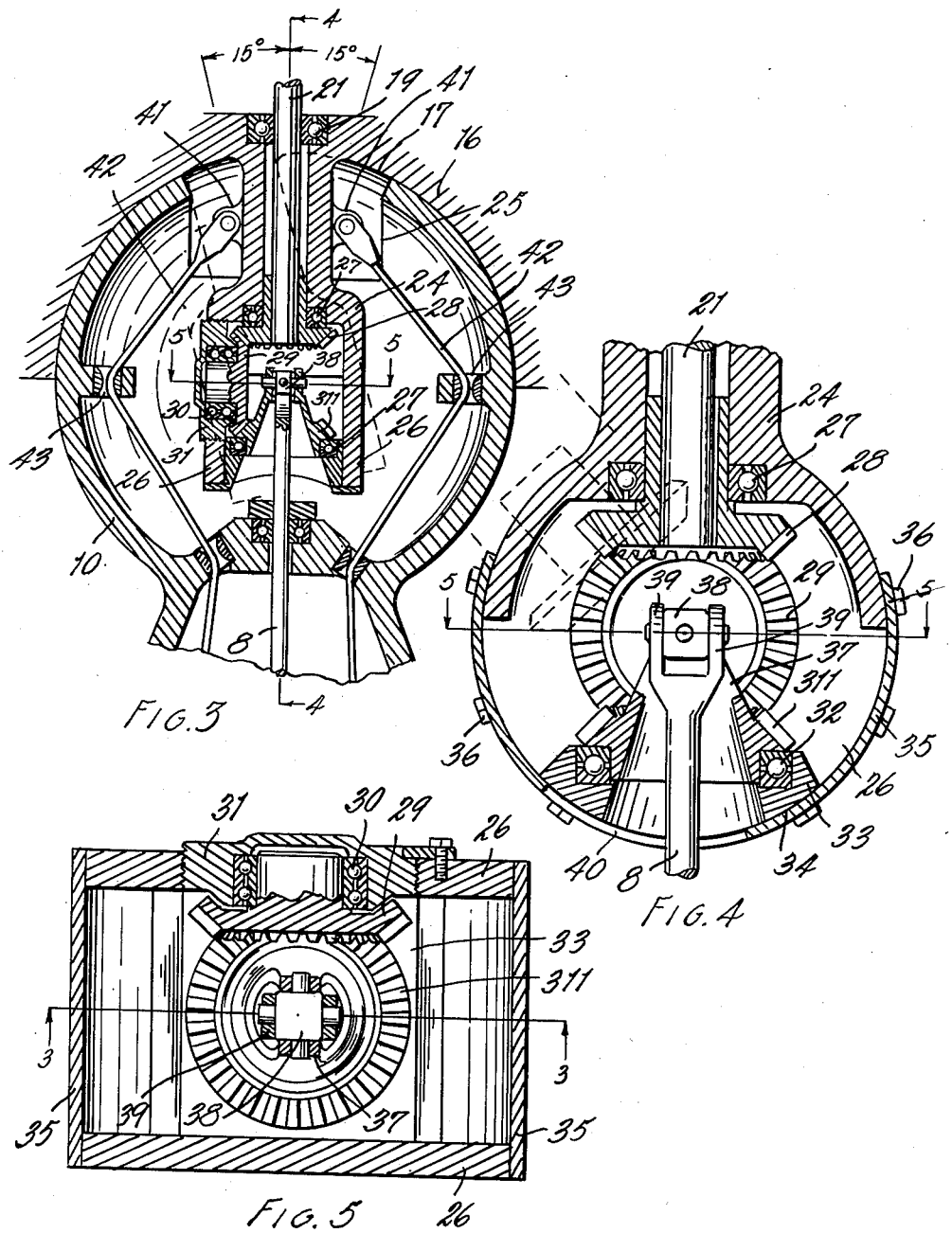

2,835,458

MEANS FOR ADJUSTABLY MOUNTING AN ANNULAR WING ON AN AIRCRAFT

Harley A. Dorman, Detroit, Mich., and Bruce A. Dorman, Hondo, Tex.

Continuation of application Serial No. 716,580, December 16, 1946. This application December 19, 1955, Serial No. 553,833

5 Claims. (Cl. 244—17.27)

Our invention relates generally to a new and improved aircraft which is characterized by a high degree of maneuverability and by simplicity of control.

More particularly our invention relates to an improved aircraft of the heavier-than-air class which embodies a unique theory of flight.

This application forms a continuation of our pending application Serial No. 716,580, filed December 16, 1946, and now abandoned.

According to a principal feature of our invention, the means for providing the lift and forward flight force components is further characterized by an inherent stabilizing influence which obviates the need for providing conventional aircraft control surfaces.

The provision of an improved aircraft of the type above-mentioned being a principal object of our invention, it is a further object of our invention to provide an aircraft having annular wings with a novel means for adjustably positioning the annular wings to stabilize the aircraft while in flight.

It is another object of our invention to provide a novel power transmission mechanism for transmitting power from a centrally situated power plant to a propeller assembly mounted in the annular wings to provide the above-mentioned air displacement.

Other objects and features of our invention will readily become apparent from the following description taken in conjunction with the accompanying drawings wherein:

Figure 1 is a fragmentary side elevational view of the aircraft of our instant invention wherein the annular wings thereof are shown adjusted for vertical ascent, the position of the annular wings assumed for forward flight being shown by means of dotted lines;

Figure 2 is a fragmentary elevational view partially in section of the front portion of the aircraft of our instant invention showing the mounting means for the forward wing element and the controls therefor;

Figure 3 is a fragmentary cross sectional view of a portion of the power transmission means referred to above and is taken along section line 3—3 of Figure 2;

Figure 4 is a sectional view of a portion of the structure shown in Figure 3 and is taken along section line 4—4 of Figure 3;

Figure 5 is a sectional view of the structure shown in Figures 3 and 4 and is taken along section line 5—5 of Figure 4; and Figure 6 is a front elevational view showing an alternate means for applying the wing and propeller assembly of our instant invention to a more conventional type aircraft.

Referring first to Figures 1 and 2, reference character 1 designates the fuselage portion of a first embodiment of our instant invention and it includes a pilot compartment 2, a passenger compartment 3 and landing wheels 4. An engine preferably of the liquid-cooled type is schematically illustrated at 5 and is connected through driveshafts 6 and gear boxes 7 to the forwardly sloping prop shafts 8.

A pair of generally conical and streamlined masts 9 are mounted on top of the body and are situated at longitudinally spaced locations. Wing supporting spheres 10 are carried by the upper ends of the masts 9 as indicated. The spheres are hollow or chambered and are preferably formed as integral castings to provide the necessary strength and rigidity for supporting wing elements generally indicated at 11.

The wings 11 are annular in shape and are of streamlined cross section as best indicated in Figure 2. The wings are provided with streamlined ribs 12 which are covered with a suitable sheet metal skin 13 to provide a double cambered construction capable of withstanding substantial torsional and bending stresses. The streamlined cross sectional shape provides a venturi-like section between the front and rear ends of the wings. The leading or front ends of the annular wings are provided with radial supporting struts 14 and the trailing or rear end of each wing is provided with radial struts 15, said struts being cambered to reduce aerodynamic resistance and to increase the structural rigidity of the same while at the same time reducing the weight. The trailing struts 15 are joined to centrally disposed mounting ribs or blocks 16 defining hemispherical sockets 17 which are adapted to receive the spheres 10 of the masts 9. Annular retaining rings 18 may be bolted to the end sides of the ribs 16 to retain the hubs on the spheres thereby defining a ball and socket joint which accommodates a universal movement of the wings with respect to the supporting masts 9.

Each of the mounting hubs 16 is provided with a bearing 19 situated adjacent the upper surface thereof, said bearings cooperating with aligned bearings 20 mounted in the center of the associated leading end edge struts 14 to support propeller shafts 21, the latter extending coaxially through the annular wing. A propeller 22 is keyed to the shaft 21 between the struts 14 and 15. By preference the propellers 22 have a radial dimension which is sufficiently large to provide only a slight radial clearance between the tip of the propeller and the inner surface of the annular wing. Thrust collars 23 are provided in front of each propeller to transmit the thrust of the propeller to the shafts 21.

Referring next to Figures 3, 4 and 5, the connection between the driveshafts 8 and the propeller shafts 21 are shown in particular detail. Since each of the annular wings and the associated driving connection between the propeller shaft 21 and the shaft 8 is identical in each case, only one will be described. The mounting hub 16 is formed with an integral gear housing 24 extending in a downward direction as viewed in Figure 2 through a slot-like opening 25 in the sphere 10. The housing 24 is generally cylindrical in shape and it terminates at its lower end in spaced parallel walls 26 situated in planes parallel to the longitudinal axis of the fuselage 1 and centrally of the spherical member 10. The lower end of the cylindrical portion 24 is formed with a shoulder to receive a bearing 27 which is coaxially aligned with the bearing 19 and cooperates therewith to rotatably support the propeller shaft 21. A driven bevel gear 28 is mounted on the lower end of the propeller shaft 21 and is in driving engagement with a connecting bevel gear 29 journalled in a roller bearing 30, the latter being carried in a bearing plate 31 threadably received in an aperture in one of the side walls 26 at the lower end of the propeller shaft housing 24 and coaxial with the transverse axis of the spherical member 10. The connecting bevel gear 29 engages a conical driving gear 311 which is rotatably supported by a floating roller bearing 32. This bearing 32 is supported in a bearing block 33 having parallel sides to permit the same to be fitted between the walls 26 of the housing 24. The lower surface 34 (see Figure 4) is arcuate in shape and is arranged to rest against and be retained between the walls 26 by an arcuate band 35 secured to the edges of the walls by bolts 36. The bearing block is formed with a truncated conical aperture therethrough which is adapted to receive the upper end of the driveshaft 8. The bearing block 33 and gear 311 are thus free to float or move relative to the hub arcuate path defined by the band 35 and the side walls 26 of the gear housing.

The conical gear 311 is formed with a conical aperture through its center and is provided with a pair of upstanding ears 37, which are apertured to receive one pair of journals of a universal joint cross member 38. The opposite pair of journals on the cross member 38 are received through bearing openings formed in the forked end 39 of the driveshaft 8 which extends through the conical aperture in the bearing block 33 and in the gear 31 to coact with the other universal joint components to provide a conventional type of universal joint. The shaft 8 extends through a slot 40 in the retaining band 35 and through a suitable ball bearing in the bottom of the spherical member to the interior of the mast 9.

Referring to Figure 3 it will be noted that the slot 25 and the spherical member 10 is wider than the cylindrical propeller shaft housing 24 so that the mounting hub 16 and wing unit 11 carried thereby may be tilted laterally on the spherical member 10 through an angle of approximately 15 degrees on either side of the vertical. This tilting of the angular wing and propeller shaft relative to the shaft 8 is accommodated by the universal joint components shown at 37, 38 and 39 without interrupting the transmission of power to the propeller.

With reference to Figures 1 and 2, it will be noted that the slot 25 extends for a considerable distance from the top of the ball 10 so that the mounting hub and wing unit carried thereby may desirably be tilted forwardly from a horizontal position to an approximately 90 degree angular position. This tilting motion of the wing unit is accommodated in the transmission mechanism, as, indicated in Figure 4 by the propeller shaft 21, gear 28 and vertical bevel gear 29 rotating on the driving gear 311, the gear 311 remaining in its same relative position with respect to the driveshaft by virtue of the floating bearing block 33 sliding between the walls 26 along the retaining band 35 of the propeller shaft housing.

The tilting motion of the wing unit is controlled by mechanism illustrated in Figures 2 and 3. The sides of the cylindrical portion 24 of the propeller shaft housing are provided with ears 41 positioned laterally on each side of the housing to which are connected control cables 42. The cables 42 are threaded through grommets or eyes 43 on the sides and bottom of the ball 10 and extend downwardly through the mast 9 and around guide pulleys conventionally illustrated at 44 to the sides of a bell member 45 on the bottom of a control lever 46. Movement of the lever 46 from side to side will pull one of the cables 42 and slacken the other cable to tilt the propeller shaft housing 24, wing mounting block or hub 16 and the propeller and wing unit carried thereby laterally of the mast and body of the aircraft. This control maintains lateral stability of the aircraft. The fact that the body of the airplane is positioned well below the wing elements makes it inherently stable and very little stabilizing adjustment of the wing elements will be necessary in flight.

The propeller shaft housing 24 is provided on its front and rear side as is shown in Figure 2 with other ears 47 to which are connected the control cables 48 which are also passed through suitable eyes or grommets in the ball 10 downwardly through the mast and around the pulleys 44 to the opposite ends of a crank 49 which is secured to an elevating lever 50 pivotally mounted on the shaft 51. Thus forward motion of the elevating lever 50 will pull the forward cable 48 and slacken the rear cable 48 to tilt the wing unit forwardly into the position indicated by the dotted lines in Figure 1. Backward movement of the elevating lever will bring the wing element to the horizontal position illustrated.

The elevating lever 50 is provided with a spring pressed grip 52 and rod 53 which are connected to the pawl 54 at the lower end of the lever. The pawl 54 is arranged to releasably engage the elevating lever 50 with a disc 55 otherwise freely rotatable on the shaft 51. The disc 55 is provided with crank arms 56 from which connecting cables 57 extend to the front and back portions of the bell member 45 of the control lever 46. Thus the pawl 54 engaging the elevating lever 50 with the disc 55, forward and backward motion of the control lever 46 will transmit motion to the elevating lever 50 and cables 48 for minor angular adjustments of the wing unit. This control maintains longitudinal stability and minor variations in climbing angle of the wing units in any major wing setting. When it is desired to make a major change in the setting of the wing unit as from vertical climb to forward flight, the spring grip 52 may be actuated to disconnect the elevating lever 50 from the control lever 46 and the elevating lever moved forwardly into the position indicated by the dotted lines in Figure 2. The control lever 46 remains connected to the control cables 42 to control lateral stability and retains its generally vertical position in front of the operator for ease in operation. After the wing unit has been swung to its new position, the spring grip may be released reconnecting the control lever 46 to the wing unit. Duplicate control cables corresponding to cables 42 and 48 extend to the rear wing element for simultaneous control of both elements.

Figure 6 illustrates a modified form of aircraft having a body 59 and landing gear 60. The body is provided with ball members 61 on each side thereof which form supports for the sockets 62 of annular wing units 63 which are mounted in coplanar relationship on each side of the body. The wing units 63 are similar to the annular wings 11 in the preferred form of the invention except that the cross struts or spokes 64 support radial air cooled engines 65 and three-bladed propellers 66 within the annular wings. The wing units 63 are provided with controls, not shown, similar to those just described by means of which the wings may be rotated about their transverse horizontal axis from a vertical position illustrated for forward flight to a more horizontal position for rapid rate of climb.

Since the aircraft illustrated in Figure 6 will be supported entirely along a transverse line through the annular wings 63 it will be necessary to provide the body 59 with a conventional aircraft tail structure, not shown, to maintain longitudinal stability. It will also be necessary for the aircraft to maintain enough forward motion to render the tail surfaces effective so the aircraft cannot ascend vertically. However, the forward speed necessary will be much lower than the speed of a conventional aircraft as the lifting force will be obtained mainly from the thrust of the propellers in the wing elements 63 rather than from translation of the wing through the air.

In operation of the preferred form of the aircraft the engine will rotate the propellers 22 within the annular wing 12 and when the wings and propellers are in a horizontal position the entire thrust of the propellers will be directly utilized in sustaining the aircraft in flight, the magnitude of the thrust being proportional to the time rate of mass displacement of air through the annular wings. After reaching the desired altitude the wing elements may be tilted forwardly as previously described so that the thrust of the propeller will have both a vertical and horizontal component to sustain and move the aircraft forwardly. In forward motion the upper and lower portions of the annular wings will create a lifting force in the same manner as an ordinary airfoil so that a greater portion of the power of the propeller may be utilized to create forward motion.

The annular character of the wings in both forms of the invention greatly increases the efficiency of the propellers since there is no end loss around the tips of the propellers and all of the air displaced by rotation of the propellers is directed along the axes of the annular wings to obtain the desired direction of thrust according to the adjustment of the wings and the propellers.

While we have particularly described certain embodiments of our invention, we contemplate that variations thereto may be made without departing from the scope of the invention as defined by the following claims.

We claim:

1. In a mounting mechanism for mounting on an aircraft an annular, cambered element with a propeller rotatable therein; a hollow ball member mounted on said aircraft and formed with a slot extending longitudinally of the aircraft, a socket member adapted to be secured to the center of said annular, cambered element and engaging said ball member, a gear housing formed on said socket member, said housing extending through said slot into said ball member and having wall members on the end thereof positioned parallel to said slot in the center of said ball member, a propeller shaft extending through said housing and having a gear on the inner end thereof positioned between said housing walls, an intermediate gear rotatably mounted on one of said housing walls and meshing with said propeller shaft gear, a bearing block positioned between said housing walls and having an arcuate lower surface, a retaining band secured to the edges of said walls for retaining said bearing block therebetween, a bearing mounted in said bearing block perpendicular to said walls, a driving gear mounted on said bearing and meshing with said intermediate gear, said driving gear having a pair of upstanding ears defining aligned apertures along a diameter of said ball member, a drive shaft extending upwardly through the bottom of said ball member and through said bearing block and driving gear, and a universal joint between said ears and said drive shaft, said slot being wide enough to permit tilting of said housing in said ball member.

2. In a mounting mechanism for mounting on an aircraft an annular, cambered element with a propeller rotatable therein; a hollow ball member mounted on said aircraft and formed with a slot extending longitudinally of the aircraft, a socket member adapted to be secured in the center of said annular cambered element and engaging said ball member, a gear housing formed on said socket member and extending through said slot into said ball member, said housing having parallel wall portions at its inner end positioned parallel to said slot in the center of said ball member, a propeller shaft extending through said housing and having a driven gear on its inner end positioned between said wall portions, an intermediate gear rotatably mounted on one of said walls and meshing with said driven gear, a bearing block positioned between said walls, an arcuate guide on said walls for retaining said bearing block therebetween to accommodate arcuate motion of said bearing block, a bearing mounted in said bearing block perpendicular to said walls, a driving gear mounted on said bearing and meshing with said intermediate gear, said driving gear having a pair of upstanding ears defining aligned apertures along a diameter of said ball member, a driveshaft extending upwardly through the bottom of said ball member and through said bearing block and driving gear, and a universal joint between said ears and said driveshaft.

3. In a mounting mechanism for mounting on an aircraft an annular, cambered element with a propeller rotatable therein; a hollow ball member mounted on said aircraft and formed with a slot extending longitudinally of the aircraft, a socket member adapted to be secured in the center of said annular cambered element and engaging said ball member, a gear housing on said socket member extending through said slot and provided with parallel wall portions at its inner end positioned parallel to said slot in the center of said ball member, a propeller shaft extending through said housing and having a driven gear on its inner end positioned between said wall portions, an intermediate gear rotatably mounted on one of said wall portions and meshing with said driven gear, a bearing block mounted between said walls for arcuate sliding motion therebetween, a bearing mounted in said bearing block perpendicular to said walls, a driving gear mounted on said bearing and meshing with said intermediate gear, said driving gear having a pair of ears positioned in the center of said ball member, a driveshaft extending upwardly through the bottom of said ball member and through said bearing block and driving gear, and a universal joint between said ears and said driveshaft.

4. In a mounting mechanism for mounting an annular, cambered element with a propeller rotatable therein on the body element of an aircraft; mating ball and socket members, one of said members being adapted to be mounted on said annular, cambered element, the other of said members being mounted on said body element, said ball being formed with a slot parallel to the longitudinal axis of said body element, a gear housing on said socket member extending through said slot and having parallel walls, a shaft extending into said socket member and housing and having a gear on the inner end thereof positioned between said walls, a vertical gear journalled in one of said walls in coaxial relationship with respect to a transverse diameter of said ball, a bearing block supported between said walls and oscillatable about the axis of said vertical gear, a floating gear rotatably mounted on said bearing block about an axis perpendicular to the axis of said vertical gear, and a second shaft having a universal joint connection with said floating gear along the axis of said vertical gear, said gears meshing to transmit power between said shafts.

5. In a mounting mechanism for mounting an annular, cambered element with a propeller rotatable therein on the body element of an aircraft; mating ball and socket members, one of said members being adapted to be mounted on said annular, cambered element, the other of said members being mounted on said body element, said ball defining a slot parallel to the longitudinal axis of said body element, a gear housing narrower than said slot on said socket member and extending through said slot and having parallel walls positioned within said ball member, a shaft extending into said housing and having a gear on the end thereof positioned between said walls, a second gear journalled in one of said walls and coaxial with a diameter of said ball, a bearing block supported between said walls and oscillatable about the axis of said second gear, a floating gear rotatably mounted on said bearing block about an axis perpendicular to the axis of said second gear, a second shaft extending into said ball from the opposite side thereof from said housing and having a universal joint connection with said floating gear along the axis of said second gear, said gears meshing to transmit power between said shafts, and four control cables connected to spaced points along the cardinal axes of one of said members and threaded through portions of the other of said members to within said body whereby movement of said cables will control lateral and longitudinal tilting movements between said members.

References Cited in the file of this patent

UNITED STATES PATENTS

| | | |
|---|---|---|
| 2,123,657 | Munk | June 12, 1938 |
| 2,216,080 | Johnson | Sept. 24, 1940 |